Nov. 25, 1952 W. M. BARKER 2,619,529

ALTERNATE ROUTE SYSTEM FOR CENTRALIZED TRAFFIC CONTROL

Filed Nov. 30, 1950 2 SHEETS—SHEET 1

Inventor
W. M. Barker,
By Neil H. Preston,
his Attorney

Nov. 25, 1952 W. M. BARKER 2,619,529

ALTERNATE ROUTE SYSTEM FOR CENTRALIZED TRAFFIC CONTROL

Filed Nov. 30, 1950 2 SHEETS—SHEET 2

Inventor

W. M. Barker,

By

Neil M. Preston, his Attorney

Patented Nov. 25, 1952 2,619,529

UNITED STATES PATENT OFFICE 2,619,529

ALTERNATE ROUTE SYSTEM FOR CENTRALIZED TRAFFIC CONTROL

William M. Barker, Scottsville, N. Y., assignor to General Railway Signal Company, Rochester, N. Y.

Application November 30, 1950, Serial No. 198,386

11 Claims. (Cl. 177—353)

Figure 1:
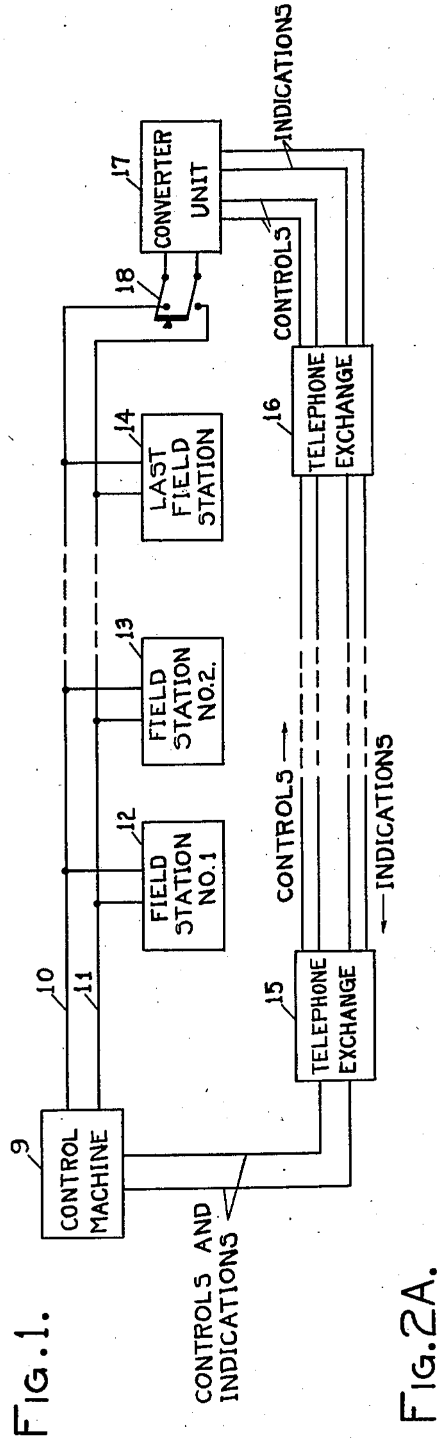

This invention relates to a centralized traffic control system, and more particularly pertains to a centralized traffic control system in which controls and indications may be transmitted between control office and field stations either over the usual line wires or over an alternate route.

In a centralized traffic control system (commonly abbreviated CTC) the switches, signals, and other associated apparatus along a trackway are remotely controlled from a control office by the transmission of control codes from the control office to the various field stations at which such apparatus is located. Indications as to the actual operated conditions of the various devices and such other information as may be desired are, in turn, transmitted from each field station to the control office. These controls and indications are transmitted over a pair of line wires connecting the control office to each of the field stations. In the event of failure of these line wires such as an open circuit, transmission between the control office and the field stations located beyond the fault becomes impossible. When the line fault occurs near the control office, transmission to most of the field stations is prevented so that the system becomes almost entirely inoperative. To overcome this difficulty, the present system provides that controls for stations to the far side of the fault may be transmitted over an alternate route directly to the last field station, i. e. the field station most remote from the control office along the normal line wire channel. Communication may then be had with those field stations by transmitting from the site of the last field station over the normal line wires to the location of the fault. The field stations on the near side of the fault may be communicated with by transmitting directly from the control office over the normal line wires to the fault. Indications may be transmitted over these same channels. In this way, communications may be maintained between the control office and all of the field stations despite the fault in the line wires.

At the site of the last field station, a converter unit is located to transfer the control codes as received from the control office to the line wires for transmission from that point toward the location of the line fault. In normal operation, this converter unit is not connected to the line wires, but may be so connected when alternate route transmission is desired by manual operation of a selector switch at the converter unit location. This converter unit also responds to the indication codes originating at the various field stations associated therewith by causing a corresponding code to be transmitted back to the control office. An object of this invention is to provide a converter unit which causes the line current to increase rapidly to the proper value upon the occurrence of a code pulse so as to provide for quicker energization of the line relay at each field station.

Another object of this invention is to provide a converter unit that it capable of transmitting indications to the control office even when failure occurs in the control code channel.

Another object is to provide apparatus at the control office permitting the selective use of either the normal line wires or the alternate route.

Still another object of this invention is to provide a converter unit wherein the alternate energization and deenergization of the CTC line wires will not result in operation of the line relay included in the converter unit.

Other objects, purposes, and characteristic features of this invention will be in part obvious from the accompanying drawings and in part made clear from the description of the invention.

Figure 2A:
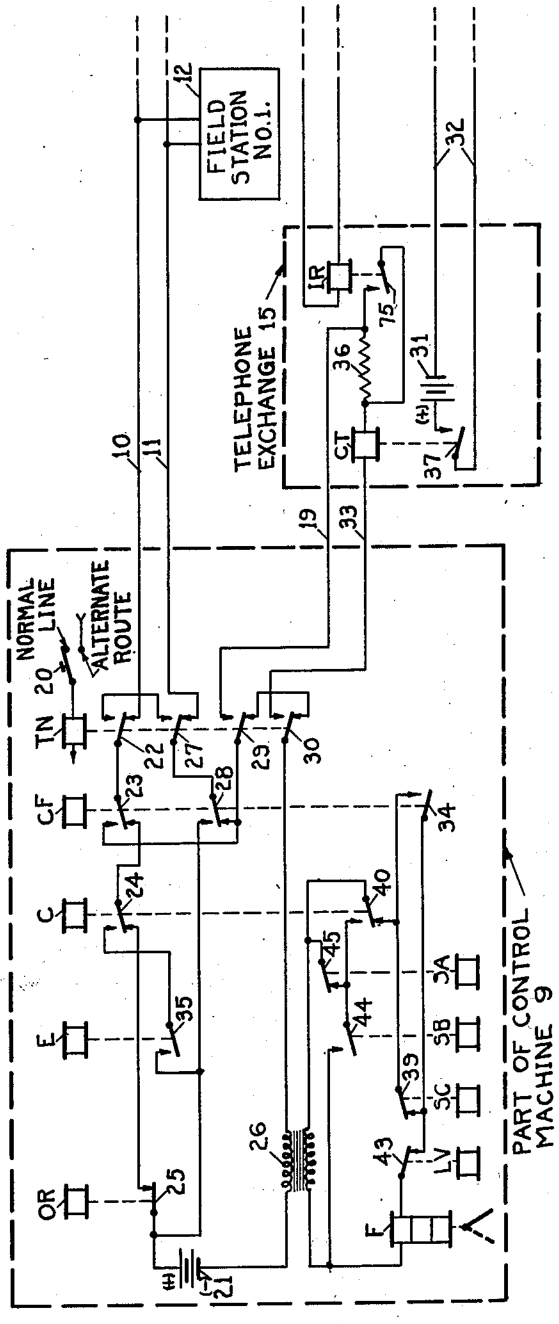
Figure 2B:
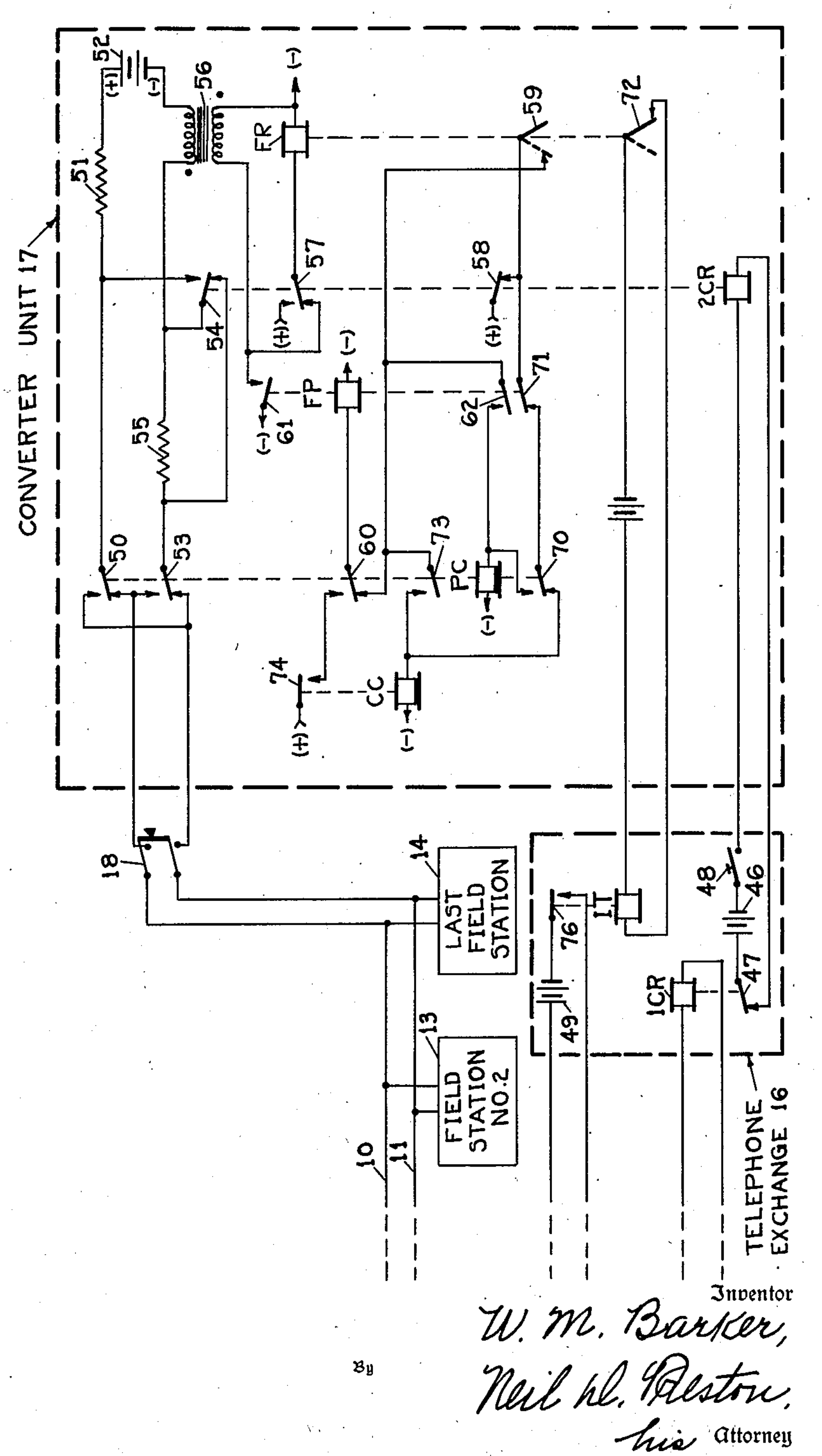

In describing the invention in detail, reference will be made to the accompanying drawings in which like reference characters designate corresponding parts in the several views and in which:

Fig. 1 illustrates in block form the alternate route system of the present invention adapted to a typical CTC system; and Figs. 2A and 2B are circuit drawings showing in detail the organization of the converter unit and also a portion of the control machine apparatus.

The parts and circuits of this invention are shown diagrammatically and conventional illustrations are used to simplify the drawings and the explanations. The drawings have been made to make it easy to understand the principles and manner of operation of this invention rather than to show the specific construction and arrangement of parts that would be used in practice. Relays and their contacts are shown in the conventional way. Symbols are used to indicate connections to the terminals of a battery or other source of electric power instead of showing all of the wiring connections to these terminals.

The way in which this alternate route control is applied to a typical CTC system is shown in general form in Fig. 1. The CTC system may be of any well known kind and may, for example, be of the kind shown in Pat. No. 2,399,734 to Hailes, et al., dated April 27, 1943. For the purposes of providing a definite disclosure, the alternate route control of this invention is specifically shown as applied to the CTC system of the Hailes, et al. patent. Some of the apparatus shown in this cited patent is also shown in the drawings of this disclosure and the same reference characters are used in the accompanying drawing as were used for this corresponding apparatus in the prior patent. The detailed circuits for this common apparatus are not shown in this disclosure because such information may readily be obtained by referring to the cited Hailes, et al. patent.

*General organization*

Referring to Fig. 1, a control machine 9 is provided to enable an operator at a remote location to control the operation of various apparatus at a number of field stations located along a trackway. Normally these controls are transmitted from the control location by the transmission of electrical pulses over a pair of line wires 10 and 11. The various field stations such as those indicated in the blocks 12, 13 and 14 are controlled by these electrical pulses appearing on the line wires 10 and 11 and in turn transmit indications over these same line wires to the control machine 9. If a line fault such as an open circuit occurs in the line wires 10 and 11, communication between the control machine 9 and the field stations located on the near side of the fault can still be maintained in the normal manner. To permit communication with the remainder of the field stations, the operator at the control machine 9 can, by operating a suitable transfer switch included in the control machine, cause the control codes for such field stations to be transmitted instead to a telephone exchange 15 or some other suitable facility such as a telegraph company. The telephone exchange then transmits the control as received from the control machine 9 over available facilities to a similar exchange 16 located in the vicinity of the last field station in the system. Indications are similarly transmitted over another channel from the telephone exchange 16 to the similar exchange 15. These transmissions between the two telephone or telegraph offices can be by any suitable means such as direct-current pulses, line wire carrier, or micro-wave radio. For purposes of illustration, communication between telephone exchanges is shown in the drawings as taking place over line wires with direct-current pulses being transmitted. When desired, the alternate route may make use of the facilities of the railroad. Such an arrangement is believed to be less desirable, however, in that such a route would parallel the original CTC line and might very well be affected by the same trouble that has rendered the normal line unusable over its complete length. Furthermore, an alternate route is presumably to be used only infrequently so that it is economically sounder to contract for the use of the needed facilities only as they are occasionally required.

The telephone exchange 16 is connected to the converter unit 17 by two pairs of wires; one for the transmission of controls, and the other for indications. The converter unit is normally not connected to the line wires 10 and 11, but can be so connected by closure of the switch contact 18 when it is desired to use the alternate route.

The CTC system of which this alternate route system is a part, is preferably a shunt-type system. In a shunt-type system, the line wires connecting the control office with the various field stations are normally energized, and the code characters constituting the control code are provided by alternately energizing and deenergizing the line wires. The transmission of indications from any field station to the control office is accomplished by alternately shunting and unshunting the line wires at the transmitting field station.

When the alternate route is used, the control code originating at the control machine 9 is transmitted over such route to the converter unit 17 which then responds by alternately deenergizing and energizing the line wires 10 and 11 in correspondence with the nature of the control code. Similarly, for the transmission of indications this converter unit 17 is responsive to the alternate shunting and unshunting of the line wires by the field stations which are located between it and the fault in the line wires to control the operation of the apparatus in the telephone exchange 16 for transmission of an indication code over the alternate route line wires, and through the telephone exchange 15 to the control machine 9.

*Detailed circuit*

The detailed circuits shown in Figs. 2A and 2B correspond to the block diagram of Fig. 1, with the exception that various blocks have been shown in greater detail. Only the portion of the control machine 9 directly associated with the operation of an alternate route link is shown in Fig. 2A. Various relays are shown, but except for the transfer relay TN, these relays are all energized in the same manner as the correspondingly designated relays in the previously mentioned Hailes, et al. patent. The relay F has three windings, and the circuit for the energization of one of these windings is as illustrated in Fig. 2A. The remaining windings of this relay are energized in the same manner as illustrated in the Hailes, et al. patent.

The transfer relay TN controls whether the normal CTC line wires or the alternate route is to be used. This relay is controlled by a contact 20 which causes relay TN to be deenergized when it is desired to transmit over the usual line wires, and causes the energization of this relay when transmission is to be made over the alternate route. Thus, when a break occurs in the usual line wires, the contact 20 must be moved to the "normal line" position to effect communication with the field stations on the near side of the line break, but must be moved to the "alternate route" position when communication is to be had with field stations to the other side of the line break.

When the system is at rest and the normal CTC line is to be used, the various relays at the control office are in the condition shown in Fig. 2A so that only the relay OR is energized. As a result, line wire 10 is connected through back contact 22 of relay TN, back contact 23 of relay CF, back contact 24 of relay C, and front contact 25 of relay OR, to the (+) side of battery 21. At the same time, line wire 11 is connected through back contact 27 of relay TN, back contact 28 of relay CF, back contact 29 of relay TN, back contact 30 of relay TN, and through the primary winding of pulse transformer 26, to the opposite terminal of battery 21. Consequently, steady energy is applied to the line wires 10 and 11. During a control cycle, relay OR becomes deenergized and relay C becomes energized. Also, relay E is then selectively energized and deenergized in accordance with the nature of the control code to be transmitted. During a control cycle, line wire 10 is connected through back contact 22 of relay TN, back contact 23 of relay CF, front contact 24 of relay C, and front contact 35 of relay E when this relay is picked up, to the (+) side of battery 21. Line wire 11 remains connected to the (−) side of battery 21 through the same circuit already described. Thus, when relay E is dropped away, the line wires 10 and 11 are not connected to the opposite terminals of battery 21 so that these line wires are deenergized. Each time that relay E is picked up, however, direct-current energy is applied to the line wires 10 and 11.

If a break occurs in the line wires 10 and 11 and the operator at the control machine 9 wishes to transmit controls or receive indications from the field stations to the far side of the line break, he operates the lever 20 to the "alternate route" position to energize relay TN. The resultant opening of back contacts 22 and 27 of this relay opens the circuit to the line wires 10 and 11 so that electrical pulses cannot be transmitted over these line wires. Instead, a circuit is then completed when the system is at rest from the (+) side of battery 21 and through front contact 25 of relay OR, back contact 24 of relay C, back contact 23 of relay CF, front contact 22 of relay TN, front contact 27 of relay TN, back contact 28 of relay CF, front contact 29 of relay TN over wire 19, through resistor 36 and the windings of the relay CT included in the telephone exchange 15, over wire 33 and through front contact 30 of relay TN and the primary winding of transformer 26, to the opposite terminal of battery 21. Therefore, during a period of rest but with relay TN energized, the control transmitting relay CT is steadily energized. With front contact 37 of relay CT closed, a circuit is completed through battery 31 to energize relay 1CR at the telephone exchange 16 over the alternate route line wires 32.

During a control cycle in alternate route transmission, a similar circuit is established for the energization of relay CT with the exception that this circuit includes front contact 35 of relay E and front contact 24 of relay C instead of front contact 25 of relay OR and back contact 24 of relay C. In this way, the energization of relay CT is dependent upon the action of the commutating relay E. When front contact 35 of relay E is closed relay CT is energized, and with this front contact 35 open, relay CT is deenergized. Thus, as front contact 37 of this relay CT is alternately closed and opened, the control running relay 1CR at the telephone exchange 16 is correspondingly energized and deenergized.

During a control cycle, relay C is energized so that its back contact 40 is open, thereby preventing energization of the upper winding of relay F in response to the voltages induced in the secondary winding of pulse transformer 26 by changes of current in the primary winding. Only during an indication cycle as will later be described, when relay C is released, can the F relay have its upper winding energized in response to the current changes in the primary winding of transformer 26.

To summarize, the operation of this part of the control machine 9 is such during a control cycle as to selectively energize the line wires 10 and 11 by battery 21 subject to the actuation of the commutating relay E, provided that relay TN is deenergized. However, when relay TN is energized, the line wires 10 and 11 are no longer energized, and instead a circuit is provided to selectively energize and deenergize relay CT included in the telephone exchange 15, subject again to the action of front contact 35 of the commutating relay E. A contact 37 of this relay CT is then effective over the circuit including the alternate route wires 32 and battery 31 to control a code receiving relay 1CR at the telephone exchange 16. As a result, contact 47 of relay 1CR is picked up whenever energy is transmitted to this telephone exchange 16 and is dropped away at other times so that this contact 47, in effect, repeats the contact 37 included in the telephone exchange 15. Back contact 47 is included in a series circuit including also a battery 46 and the windings of relay 2CR located in the converter unit 17.

It is contemplated that the communication means between the telephone exchanges will be provided only when required. Under those circumstances, back contact 47 of relay 1CR is normally closed so that relay 2CR would normally be energized. To prevent unnecessary power consumption, battery 46 is normally disconnected as by a manually operable switch 48. Then on the infrequent occasion when the alternate route is to be used, this switch contact is closed.

As already explained, when the alternate route is used but during a rest period, relay CT is energized. Consequently, relay 1CR is also energized with its back contact 47 open so that relay 2CR is deenergized. During a control cycle, each deenergization of relay CT causes the deenergization of relay 1CR and the picking up of relay 2CR.

When the system is at rest, the various relays at the converter unit assume the positions shown in Fig. 2B. In alternate route operation, the contacts of switch 18 are assumed to be closed. Manual operation of this switch 18 may be obtained by telephone communication between the control machine operator and a maintainer who will be instructed to close the switch contacts 18 for alternate route operation. Contact 48 at the telephone exchange 16 is, at the same time, operated to its closed position. The output wires of the converter unit 17 are thus connected to the line wires 10 and 11 at the far end of the CTC line. Line wire 10 is then connected through a back contact 50 of relay PC and through current-limiting resistor 51 to the (+) side of a battery 52. At the same time, line wire 11 is connected through back contact 53 of relay PC, back contact 54 of relay 2CR, and the primary winding of a pulse transformer 56 to the opposite terminal of battery 52. Therefore, the line wires 10 and 11 are energized with direct-current energy during a period of rest. Thus, the condition established corresponds with that provided for field stations located on the other side of the line fault which are similarly energized during a period of rest when the transfer relay TN is in a released condition.

Each time that the normally deenergized relay 2CR at the converter unit location becomes energized, its front contact 54 closes so that the line wires 10 and 11 are connected together through the discharge resistor 55. At the same time, this closing of front contact 54 shunts the battery 52 through the current-limiting resistor 51 and the primary winding of pulse transformer 56. The resulting resistance in this shunt path for battery 52 is less than that presented by the line wires 10 and 11 so that the current supplied by battery 52 and passing through the primary winding of pulse transformer 56 is actually increased at such time even though no energy is then supplied to the line wires 10 and 11. Each time that back contact 54 of relay 2CR is closed, thereby connecting line wires 10 and 11 to the opposite terminals of battery 52, the current supplied by battery 52 actually decreases. In most of the systems of the prior art, the current through the line wire circuit including the pulse transformer decreases to zero during the "off" periods of the code. At the beginning of an "on" period when the line wire circuit is again energized, the rise of current is impeded by the transformer inductance so that the build-up of current in the line wires proceeds but slowly. With the circuit organization of the present invention, however, the current is not decreased during the code "off" periods but is actually slightly increased. For two reasons, this allows the current in the line wires to reach its normal value for a period of energization more quickly. The first is that the difference in current through the transformer winding between the "on" and "off" periods of the code is reduced so that the transformer inductance has a smaller effect upon the change of current taking place. The second reason is that the direction of change in the current at the beginning of a period of energization, i. e. a decrease, induces a voltage in the primary winding of transformer 56 which is of such a polarity that it tends to maintain the current through the winding at its previous higher value. Consequently, the polarity of this voltage is such as to add to the battery voltage, thereby momentarily increasing the voltage applied to line wires 10 and 11 above the normal voltage supplied by battery 52. This momentary higher-than-normal voltage aids in building up the current in the line wires to the full, steady-state value with the result that the line relays at the associated field stations are more quickly picked up.

As the current through the primary winding of the transformer 56 alternately increases and decreases during a control cycle subject to the operation of contact 54 of relay 2CR, a corresponding voltage is induced in the secondary winding of this transformer. It is desirable, however, that relay FR, connected across the secondary winding through back contact 57 of relay 2CR not be energized to its opposite conditions in response to these induced voltages. Relay FR is a polar relay, and its contacts remain in the position to which they are last actuated. When current passes through the windings of this relay from left to right, the contacts of this relay are operated to their right-hand position; and when current passes through the windings of this relay from right to left in the drawing, this relay is energized so that its contacts move to their left-hand positions. As will presently be described, relay FR is normally in the condition wherein its contacts are in the right-hand position.

Each time that front contact 54 of relay 2CR is closed, the current through the primary winding of transformer 56 is increased as previously described. The resulting voltage induced in the primary winding is of a polarity such that the left-hand end of this winding becomes positive with respect to the right-hand end. The polarity markings (dots) adjacent both primary and secondary windings indicate that the right-hand end of the secondary winding will at that time also assume a positive potential with respect to the left-hand end. Consequently, the current passing through the windings of relay FR would ordinarily be in the direction from right to left and would cause this relay to be energized so as to operate its contacts to their left-hand positions. To prevent this undesired operation, each energization of relay 2CR opens back contact 57 and instead provides a circuit through front contact 57 to (+). As a result, current is supplied from this (+) terminal and through the windings of relay FR to (—) and the direction of this current is such that the contacts of this relay remain in their right-hand positions.

Each time that relay 2CR becomes deenergized, the closure of back contact 54 connects the battery 52 to the wires 10 and 11 with a resulting decrease of current supplied by battery 52. This decrease of current induces a voltage in the primary winding of transformer 56 so that right-hand end of this primary winding becomes positive with respect to the other end. The secondary winding thus has a voltage induced in it with the polarity causing the left-hand end to become positive with respect to the other end of this primary winding. This polarity of voltage causes current to pass through the back contact 57 of relay 2CR and the windings of relay FR in the direction from left to right. With this polarity of energization, the contacts of relay FR again remain in their right-hand positions. Thus, the energization of relay FR is unaffected by the intermittent operation of relay 2CR during a control cycle. This result is accomplished by either disconnecting relay FR from the secondary winding of transformer 56 when the induced voltage across this secondary winding would be such as to operate the contacts to their left-hand positions or by causing the induced voltage to be of such a polarity that the direction of current passing through the windings of relay FR will not cause the contacts to be operated to the left-hand positions.

When any field station desires to transmit an indication to the control office, the conditioning period of such an indication code is initiated by the shunting of the line wires 10 and 11 at that field station. This shunting of the line wires increases the current supplied by battery 52 and, as previously explained, an increase of current through the primary winding of transformer 56 causes a current flow through the circuit including back contact 57 of relay 2CR and the windings of relay FR of such a direction that the contacts of this relay are operated to their left-hand positions. When this actuation of relay FR occurs in the conditioning period of an indication cycle, a circuit is completed through the back contact 58 of relay 2CR, left-hand contact 59 of relay FR, back contact 60 of relay PC, and the windings of relay FP, to (—). Consequently, relay FP becomes energized and its front contact 61 is closed. The closure of this front contact 61 connects the left-hand terminal of the secondary winding of transformer 56 to (—) thereby shunting the secondary winding of this transformer with the result that changes of current in the primary winding can no longer affect the energization of relay FR. As soon as relay FP becomes energized, its front contact 62 also becomes closed so that a circuit is completed through the contacts 58 and 59 and through this front contact 62 and the windings of relay PC, to (—). This circuit permits the energization of the pole-changing relay PC. One result of the energization of this relay PC is that the closure of its front contacts 50 and 53 reverses the polarity of the energization applied to wires 10 and 11. This reversal of polarity is required to lock out all other field stations to prevent their transmitting indications when one of the stations has already begun to transmit its indication. Also, when relay PC picks up, its back contact 60 opens so that the energizing circuit for relay FP is interrupted. Therefore, relay FP drops away and the opening of its front contact 62 opens the pick up circuit just described for the energization of the pole-changing relay PC. Since the picking up of relay PC has caused a stick circuit to be completed through back contact 58 of relay 2CR, back contact 71 of relay FP, and front contact 70 of relay PC, this relay remains energized even through its pick up circuit is opened by the dropping away of the contacts of relay FP. Relay PC is provided with slow release characteristics so that it will remain picked up during the crossover time of the contacts of relay FP. In other words, the release time of relay PC must be sufficient so that it will remain picked up from the time its pick up circuit is broken by the opening of front contact 62 until the closing of back contact 71 completes its stick circuit. When relay FP drops away, its front contact 61 also opens so that the shunt on the secondary winding of pulse transformer 56 is removed and relay FR can again become responsive to the changes of current in the primary winding of this transformer.

To summarize, the first energization of relay FR with its contacts moving to their left-hand positions causes the energization of relay FP. The picking up of relay FP then completes a pick up circuit for relay PC, and when this latter relay picks up a stick circuit is completed to hold it in that condition. The picking up of relay PC also causes the deenergization of relay FP. Thus, relay FP is, in effect, picked up only for the time required for relay PC to become energized and close its front contacts. The purpose of this operation is to permit shunting of the secondary winding of transformer 56 during the time that relay PC is picked up and the polarity of energization to the wires 10 and 11 reversed. In this way, relay FR cannot be affected by the change of current resulting from the pole-changing operation.

During the conditioning period of an indication cycle, the pole-changing relay PC becomes energized and is maintained in this condition throughout the indication cycle as previously explained by a stick circuit that includes back contact 58 of relay 2CR. To restore relay PC to its normal released condition at the end of an indication cycle, a control is ordinarily transmitted from the control machine 9 over the alternate route link to cause the picking up of the normally released relay 2CR so that its back contact 58 will be opened for a brief interval to open the stick circuit. The releasing of relay PC restores the normal polarity of energy to the line wires and thus permits any of the field stations to transmit an indication. To ensure that the control office apparatus is properly conditioned to receive such further indications, it is desirable that the control for the release of relay PC originate at the control office and be transmitted when the control office apparatus is thus properly conditioned. If, however, a fault should occur in the alternate route link to prevent the picking up of relay 2CR, back contact 58 remains closed so that relay PC cannot become deenergized. As a result, the line wires 10 and 11 remain pole-changed so that indications cannot be transmitted from the various field stations located between the end of the line wires and the fault in the line wire link. Check relay CC is included in the apparatus comprising the converter unit 17 to prevent this undesired lock out of indications in the event of failure of the outbound channel provided for the transmission of controls.

During the time that the system is at rest, relay CC is energized through a circuit from (+) and including back contact 58 of relay CR, back contact 71 of relay FP, back contact 70 of relay PC, and through the windings of relay CC to (−). Thus, relay CC is steadily energized during a period of rest. During a control cycle, back contacts 70 and 71 of relay PC and FP respectively remain closed. Each time that back contact 58 is closed, relay CC is momentarily energized. This relay CC is provided with slow release characteristics as indicated by the base line for the symbol designating this relay so that it remains picked up during a control cycle despite the intermittent nature of its energization.

During an indication cycle, relay PC is maintained in a picked up condition so that the above-described circuit for the energization of the check relay CC is opened by the opening of back contact 70 of relay PC. Throughout an indication cycle, however, contact 59 of relay FR is alternately operated between its left and right-hand position. Each time that contact 59 of relay FR is operated to its left-hand position, a circuit is completed from (+), through back contact 58 of relay 2CR, left-hand contact 59 of relay FR, front contact 73 of relay PC, and through the windings of relay CC to (−). Although relay CC is thus again energized only intermittently, it remains picked up because of its slow releasing characteristics.

In the event that relay 2CR cannot be picked up, the first indication cycle originating at a field station located between the converter unit 17 and the fault in the line wires will be correctly transmitted over the alternate route back to the control machine 9 because the lock out of indication transmissions does not occur until the transmission of an indication cycle has caused the pole-changing relay PC to be picked up and held in that condition by the failure of the outbound channel for controls. At the end of such first indication cycle, however, contact 59 of relay FR remains in its right-hand position resulting in the opening of the circuit for the energization of relay CC. As a result, relay CC drops away after a short interval corresponding to the slow releasing characteristics of this relay. The resultant closure of back contact 74 of relay CC closes a circuit for the energization of relay FP which circuit includes this back contact 74 and front contact 60 of relay PC. Relay FP picks up and in doing so opens its back contact 71 which is included in the stick circuit for relay PC. Relay PC, therefore, drops away thereby closing its back contacts 50 and 53 so as to restore the normal polarity of energization to the line wires 10 and 11. At the same time, front contact 60 of relay PC is opened so that relay FP is again quickly deenergized. The result of the above-described operation involving relay CC is that the dropping away of this relay causes first the picking up of relay FP followed, in turn, by the deenergization of relay PC. When relay PC is finally released, relay FP also becomes released. Thus, once again relay FP is operated to close its front contacts during the time that the line wires 10 and 11 are pole-changed by the relay PC so that, with front contact 61 of relay FP closed during this interval, the secondary winding of transformer 56 is shunted with the result that the line relay FR is not affected by the pole-changing operation. With the line wires 10 and 11 again steadily energized with the normal polarity, the various field stations located between the end of the CTC line and the fault in the line can again transmit their indication codes over the alternate route link to the control machine 9.

Although the means thus provided ensures that relay PC will not remain picked up at the end of an indication cycle, it is still considered desirable that this control of relay PC be normally initiated at the control office. The slow release characteristics provided for relay CC must be such that the drop away of relay PC caused by the dropping away of relay CC does not occur until the control office apparatus has been restored to its normal condition. A fixed time interval must thus be added and to allow continually for this longer period of time slows up the rate at which successive indication can be transmitted. Also, since relay PC cannot be dropped away until the control office apparatus is restored, a control transmitted immediately following such restoration may occur before the pole-changing operation has taken place so that such control is not properly received. For this reason, it is advantageous to cause a positive control to be transmitted from the control office when the control office apparatus is cleared out so that another indication can quickly be transmitted. The circuit organization of the present invention does, however, prevent a lockout of the various field stations in the event that the pole-changing relay cannot be released.

During an indication cycle, relay IT at the telephone exchange 16 is selectively controlled by contact 72 of relay FR so that this relay is energized whenever contact 72 is in its right-hand position but deenergized whenever this same contact is in the left-hand position. The apparatus at the telephone exchange 16 is then effective in response to the operation of a contact 76 of this relay IT to control the operation of relay IR at the telephone exchange 15 by alternately opening and closing a series circuit including a battery 49 and the winding of relay IR. Front contact 75 of this relay is connected in parallel with a resistor 36 which is included in series with relay CT. As previously explained, relay CT is normally energized during a period of rest by having its winding connected through resistor 36 to the opposite terminals of battery 21. During this time, the current through the windings of relay CT and also through the primary windings of pulse transformer 26 is determined by the resistance of this circuit. The current in this circuit is also subject, however, to the actuation of contact 75. Thus, when front contact 75 is closed, resistor 36 is shorted but so that the current delivered by battery 21 to the relay CT is increased. This increase of current through the primary winding of pulse transformer 26 induces a voltage in the secondary winding thereof. An induced voltage of opposite polarity appears across the terminals of this winding each time that the current through the primary winding is decreased by opening front contact 75.

During a period of rest, back contacts 43, 40 and 39 of relays LV, C and SC respectively are closed so that relay F may be energized by the voltage induced in the windings of transformer 26 in the conditioning period of an indication cycle. Then when relays SC and CF pick up in the indication cycle as explained in the Hailes et al. Patent No. 2,399,734, the upper winding of relay F is energized first with one polarity and then the other through a circuit including back contact 40 of relay C, front contact 34 of relay CF, and back contact 43 of relay LV. Contacts 43, 44, and 45 of relays LV, SB, and SA respectively are included for reasons fully set forth in the Hailes et al. patent. The resultant operation of relay F in response to the received indication codes then makes possible the required stepping of the stepping banks at the control office during reception of an indication code.

The alternate route link system of the present invention offers a means of greatly reducing delay in train movements in the event of a fault in the regular line wires used for CTC communication. The organization of the present invention is particularly suitable because it permits indication codes to be transmitted even though a failure should occur in the outbound channel used for the transmission of controls. In addition, the converter organization is so devised that the application of energy to the line wires connecting the converter with the various field stations has the effect of momentarily raising the voltage level applied to the line wires above that normally applied by the battery used so that the line relays at the field station may more quickly assume their picked up positions. The organization also provides that the line relay at the converter location is unaffected by changes of energization of the line wires taking place during a control cycle.

Having described an alternate route link system as one embodiment of the present invention, it is desired to be understood that this form is selected to facilitate in the disclosure of this invention rather than to limit the number of forms which it may assume; and, it is to be further understood that the various modifications, adaptations, or alterations may be applied to the specific form shown to meet the requirements of practice, without in any manner departing from the spirit or scope of the present invention.

What I claim is:

1. An alternate route link for a centralized traffic control system comprising, a control office and a plurality of field stations, a pair of line wires connecting said field stations with said control office, transmitting and receiving means at said field stations and said control office for causing controls and indications comprising coded direct-current pulses to be transmitted between said control office and said field stations over said line wires, a converter unit located near the field station most remote from said control office along said line wires, communications means for transmitting intelligence between said control office and said converter unit, said converter unit including transmitting means governed by the intelligence received from said control office for causing a control code of direct-current pulses to be transmitted over said line wires to said field stations, receiving means included in said converter unit responsive to indication codes transmitted from said field stations for causing said indications to be transmitted over said communications means to said control office, whereby communications between said control office and said field stations is maintained over said line wires and over an alternate route comprising said communications means in the event of a fault in said line wires.

2. In an alternate route link organization for a centralized traffic control system, a control office and a plurality of field stations, a pair of line wires connecting said control office with said field stations, transmitting and receiving means at said field stations and said control office providing for the transmission of controls and indications comprising coded pulses of direct current over said line wires between said control office and said field stations, a converter unit located near the field station most remote from said control office along said line wires, communications means for transmitting intelligence between said control office and said converter unit, said converter unit including transmitting means governed by the intelligence received from said control office for causing a control code of direct-current pulses to be transmitted to said field stations over said line wires and receiving means responsive to indication codes transmitted from said field stations over said line wires for causing said indications to be transmitted over said communications means to said control office, pole-changing circuit means included in said converter unit responsive to the reception of an indication from one of said field stations for reversing the polarity of energization applied to said line wires to thereby lock out all other field stations, whereby controls and indications may be transmitted between said control office and said field stations even upon the occurrence of a fault in said line wires.

3. In a centralized traffic control system, means for transmitting controls from a control location to a plurality of field stations over a pair of line wires including, a series-connected combination including a direct-current source and an inductive circuit element and resistance connected across said line wires to energize said line wires, circuit means for selectively shunting said series-connected combination to thereby deenergize said line wires without decreasing the current through said inductive circuit element, a controlled device including a line relay connected across said line wires at each of said field stations responsive to the current in said line wires, whereby each unshunting of said line wires causes a rapid increase of current in said line wires to thereby cause said controlled devices to be rapidly actuated.

4. In a centralized traffic control system, means for transmitting controls from a control location to a plurality of field stations including, a pair of line wires, a source of direct-current energy for energizing said line wires, an inductive circuit element and resistance included in series with said direct-current source, circuit means for selectively shunting and unshunting the series combination of said direct-current source and said inductive element and said resistance, said circuit means also selectively including a separate resistance in series with said line wires when selectively shunting said series combination, and relay circuit means at each field station responsive to the current in said line wires, whereby said shunting deenergizes said line wires without decreasing the current through said inductive circuit element, and whereby said unshunting causes a rapid increase of current in said line wires causing said relay circuit means at each field station to be quickly actuated.

5. In a centralized traffic control system, means for transmitting controls from a control location to a plurality of field stations comprising, transmitting apparatus at said control location including a battery, an inductance, a current-limiting resistance, a pair of line wires, circuit means for connecting said battery and said inductance and said resistance in series across said line wires, circuit means for alternately connecting and disconnecting a shunt in parallel with the series combination of said battery and said inductance and said resistance, receiving apparatus at each of said field stations including a line relay having its windings connected across said line wires, whereby each unshunting of said battery and inductance causes a rapid increase in the current in said line wires to thereby cause said line relay to be quickly picked up.

6. A system for transmitting controls between a control location and a plurality of field stations comprising, a pair of line wires connecting said control location with said field stations, receiving apparatus at the control location including a transformer having its primary winding included in series with said line wires and energized by the current in said line wires, transmitting apparatus at said control location including a source of direct current for energizing said line wires, and relay circuit means for selectively shunting said source of direct current and said transformer primary winding to thereby deenergize said line wires and simultaneously increase the direct current through said primary winding, a controlled device at each of said field stations and at the control location, said controlled device at each field station being connected across said line wires, and said controlled device at said control location being connected to a secondary winding of said transformer only while said transmitting apparatus is inactive, whereby each unshunting of said source of direct current and said transformer primary winding momentarily energizes said line wires with a voltage higher than the voltage of said direct current source and causes said control device at each field station to be quickly operated to its opposite condition.

7. In a system for transmitting controls between a control office and a plurality of field stations comprising, a pair of line wires, receiving apparatus at said control office including a transformer having a primary winding energized by changes in current in said line wires, a polar relay having its windings normally connected across a secondary winding of said transformer, transmitting apparatus at said control office including relay circuit means for selectively energizing and deenergizing said line wires, means governed by said relay circuit means for disconnecting the windings of said polar relay from said transformer and for energizing said relay with a polarity of energization to hold said relay in its normal actuated condition when said transmitting apparatus is deenergizing said line wires, whereby actuation of said line relay by changes of current in said line wires during the transmission of controls to said field stations is prevented.

8. A system for transmitting controls between a control office and a plurality of field stations comprising, a pair of line wires, transmitting apparatus at said control office including relay circuit means for alternately energizing and deenergizing said line wires to thereby cause direct-current pulses to be transmitted to said field stations, receiving apparatus at said control office including a pulse transformer having its primary winding energized by the current in said line wires, a polar relay having its windings connected across the secondary winding of said pulse transformer in such a manner that actuation of said relay circuit means from its normal condition would operate said polar relay from its normal condition, means governed by the actuation of said relay circuit means from its normal condition for disconnecting the winding of said polar relay from said secondary winding and for energizing said relay winding with the polarity to maintain said relay in its normal position, whereby actuation of said receiving means by the transmission of controls from said control office is prevented.

9. In a system for transmitting controls between a control office and a plurality of field stations, a pair of line wires connecting said control office to said field stations, receiving apparatus at said control office including a transformer having its primary winding connected across said line wires and a polar relay having its winding energized by the secondary winding of said transformer, transmitting apparatus at said control office including relay circuit means for alternately energizing and deenergizing said line wires with direct current to thereby cause a coded control to be transmitted to said field stations, said polar relay and said transformer connected to normally cause said polar relay to be actuated from its normal condition by the change of current in said primary winding produced by operation of said relay circuit means from its normal condition, means governed by said relay circuit means for disconnecting the winding of said polar relay from said transformer secondary winding and for energizing said relay with a polarity of energization to hold said relay in its normal condition, whereby said polar relay included in said receiving apparatus is not actuated during the transmission of controls from said control office.

10. A centralized traffic control system providing for the transmission of controls and indications between a control office and a plurality of field stations through a converter unit comprising, communication channels connecting said converter to said control office, a line wire channel connecting said converter to said field stations, said converter unit including transmitting means governed by said control office for transmitting controls to said field stations, pole-changing circuit means effective during transmission of an indication from any of said field stations to reverse the polarity of energization on said line wires to thereby lock out all other field stations, stick circuit means governed by said control office and effective on said pole-changing circuit means to maintain said lock out conditions during transmission of said indication, a check relay operable to either of two conditions, means governed by the reception at said converter unit of said indication to actuate said check relay, means governed by said pole-changing circuit means to actuate said check relay when said indication is not being transmitted, circuit means controlled by said check relay and acting upon said stick circuit means to cause said pole-changing circuit means to restore the normal polarity of energization upon said line wires, whereby the transmission of indications from said field stations is not prevented following the transmission of an indication from one of said field stations.

11. A centralized traffic control system providing for the transmission of controls and indications between a control office and a plurality of field stations through a converter unit and comprising, a pair of line wires connecting said converter unit with said field stations, communications channels connecting said converter unit to said control office, said converter unit including transmitting means comprising a code responsive relay governed by said control office for transmitting controls to said field stations, a pole-changing relay effective when energized during the transmission of an indication from any of said field stations to reverse the polarity of energization applied to said line wires to thereby lock out all other field stations, a stick circuit for said pole-changing relay including a normally closed contact of said code responsive relay, receiving apparatus at said converter unit including a line relay controlled by the changes in current in said line wires during the transmission of indications from said field stations, a check relay, means including a contact of said line relay for maintaining said check relay energized during the transmission of said indications, means including a back contact of said pole-changing relay for normally maintaining said check relay energized when indications are not being transmitted, circuit means governed by the deenergization of said check relay for interrupting said stick circuit, whereby the failure of said code responsive relay to pick up and effect the deenergization of said pole-changing relay causes the picking up of said check relay and the deenergization of said pole-changing relay to thereby prevent said lockout.

WILLIAM M. BARKER.

REFERENCES CITED

The following references are of record in the file of this patent:

UNITED STATES PATENTS

| Number | Name | Date |
|---|---|---|
| 2,003,952 | Phinney | June 4, 1935 |
| 2,095,703 | Judge | Oct. 12, 1937 |
| 2,135,295 | Stewart et al. | Nov. 1, 1938 |